3,497,713
PERMANENT, VARIABLE, STATIC MAGNETIC FIELD SOURCE
William W. Davis, Minneapolis, Minn., assignor to Sperry Rand Corporation, New York, N.Y., a corporation of Delaware
Continuation of application Ser. No. 125,490, July 20, 1961. This application July 5, 1968, Ser. No. 748,127
Int. Cl. G11c 11/14, 11/20
U.S. Cl. 307—88                    15 Claims

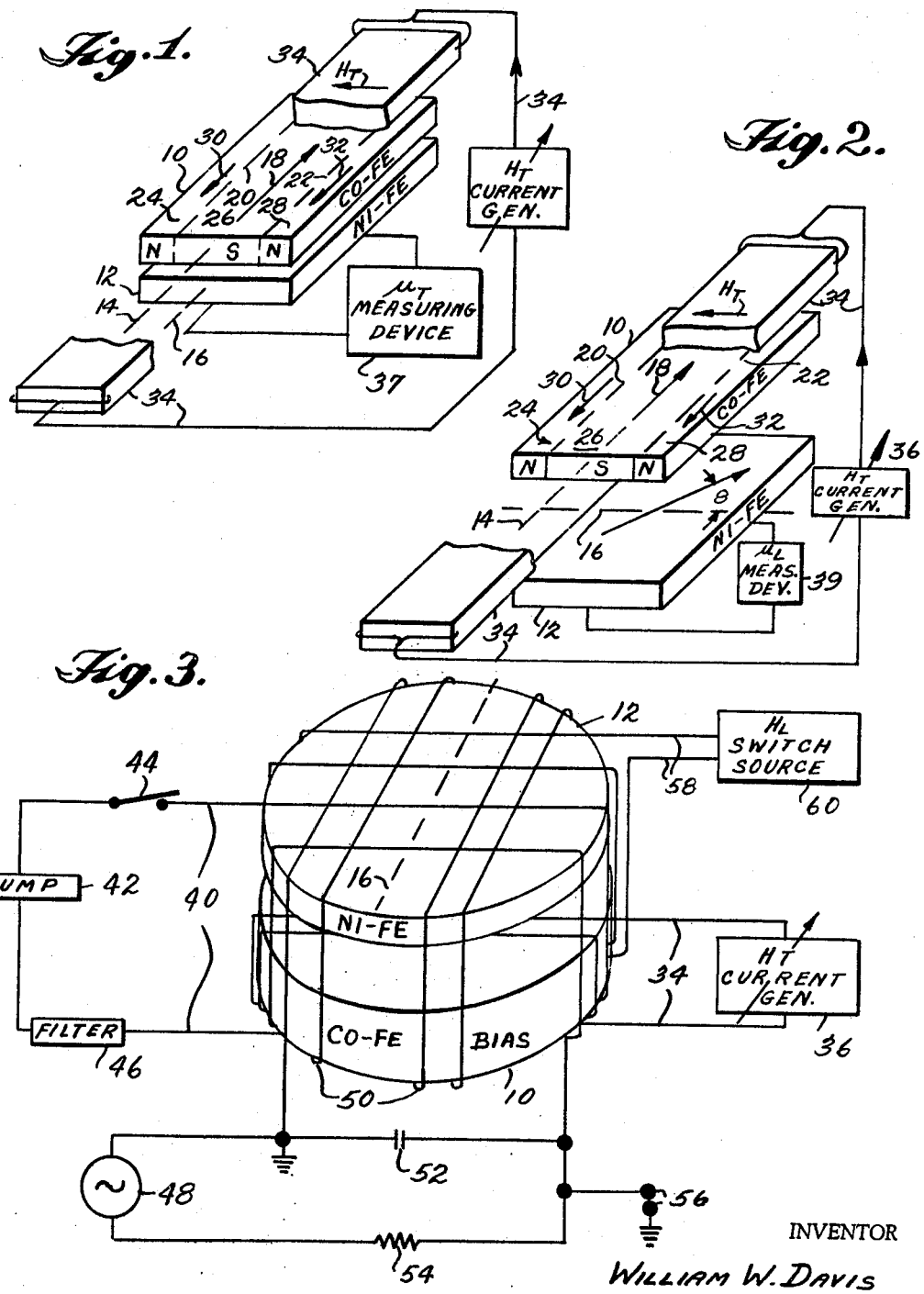
Feb. 24, 1970 — W. W. DAVIS — 3,497,713
PERMANENT, VARIABLE, STATIC MAGNETIC FIELD SOURCE
Original Filed July 20, 1961 — 2 Sheets-Sheet 1
INVENTOR
WILLIAM W. DAVIS
BY Cushman, Darby & Cushman
ATTORNEYS United States Patent Office 3,497,713
Patented Feb. 24, 1970

ABSTRACT OF THE DISCLOSURE

A magnetic device including a multistable magnetic film having a rotatable magnetization vector and a magnetic element, permanently adjacent the film, having adjusting means coupled thereto for causing the element's degree of remanent magnetization to assume any one of a plurality of different partially demagnetized stable states between and including its fully saturated stable states. Each different stable state of the element provides a corresponding different external remanent magnetic field strength in the area of the film causing a corresponding different effect upon the magnetization of the film.

The device may be operated as a parametric device by coupling a pump field to the film and detecting the effect of the element's external remanent magnetic field upon the film's oscillating vector. Further, as the element's external remanent magnetic field may be adjusted, a plurality of such devices may be caused to provide output signals of substantially similar amplitude for operation with a majority logic device. Additionally, the adjusting means may couple an analog signal to the element for causing the degree of remanent magnetization of the element to be determined by the amplitude and direction of the analog signal whereby the output signal provided by the film is representative of the analog signal amplitude and direction.

CROSS-REFERENCE TO RELATED APPLICATION

The invention herein described was made in the course of or under a contract or subcontract thereunder with the Department of the Navy, and is a continuation application of parent application Ser. No. 125,490 filed July 20, 1961 and now abandoned.

BACKGROUND OF THE INVENTION

Magneitc film parametric devices have been disclosed and claimed in the copending applications of Davis and Pohm, Ser. No. 61,981, filed Oct. 11, 1960 now Patent No. 3,433,975, Ehresman and Gutzmann, Ser. No. 79,664, filed Dec. 30, 1960 now abandoned, Ehresman, Ser. No. 81,360, filed Jan. 9, 1961 now Patent No. 3,455,674, and Ehresman and Olson, Ser. No. 122,922, filed July 10, 1961 now Patent No. 3,193,694. Particularly in the first of these applications, parametric devices such as amplifiers, modulators and oscillators, are disclosed, with it being recognized in that application, as well as in each of the others, that for high frequency operation biasing of the magnetic film is generally desirable. As particularly indicated in the Ehresman application, Ser. No. 81,360, it is desirable to have the bias that is applied to the film set at a predetermined strength, in order to get the operation desired.

SUMMARY OF THE INVENTION

The present application provides for a magnetostatic biasing means in the form of a magnetic element that is capable of stably exhibiting any one of a variety of strengths of external fields. This element is permanently disposed relative to the film so that the instant external field of the element can influence the magnetization vector of the film in a predetermined manner. Additionally, there is provided means for adjusting the external field of the magnetic element so as to regulate the biasing effect thereof on the film.

It is therefore an object of this invention to provide in a magnetic device of the type including a multistable magnetic film having a rotatable magnetization vector, a magnetic element permanently disposed adjacent the film along with adjusting means for regulating the strength of the external field of the element and consequently its biasing effect on the film.

Preferably, the auxiliary magnetic element is a second multistable magnetic film which, like the other film, has an effective single easy magnetization axis which may be disposed either parallel or transversely of each other. When the axes are parallel disposed, adjustment of the strength of the external field of the auxiliary film adjusts the initial transverse permeability of the main film. On the other hand, when the easy axis of the two films are transversely disposed relative to one another, adjusting the field strength of the auxiliary film varies the permeability of the main film along its own easy axis.

Accordingly, another object of this invention is the provision of ways to adjust either the initial transverse permeability or initial longitudinal permeability of the principle film.

Further, the two magnetic elements may be considered a non-destructively readable analog storage cell since any remanent state between and including maximum negative or positive remanence may be stored in the "auxiliary" element and read-out thereof without disturbing the stored state by measuring the permeability of the other element, and the provision of such is further object of the invention.

BRIEF DESCRIPTION OF THE DRAWINGS

FIGURE 1 is a schematic representation of the two films in spaced superposed relationship with easy axes parallel;

FIGURE 2 is similar to FIGURE 1 except the films are separated further for illustration purposes only, and the easy axes are transversely oriented; and FIGURE 3 illustrates a parametric device employing the principles of this invention.

DESCRIPTION OF THE PREFERRED EMBODIMENTS

Figure 4:
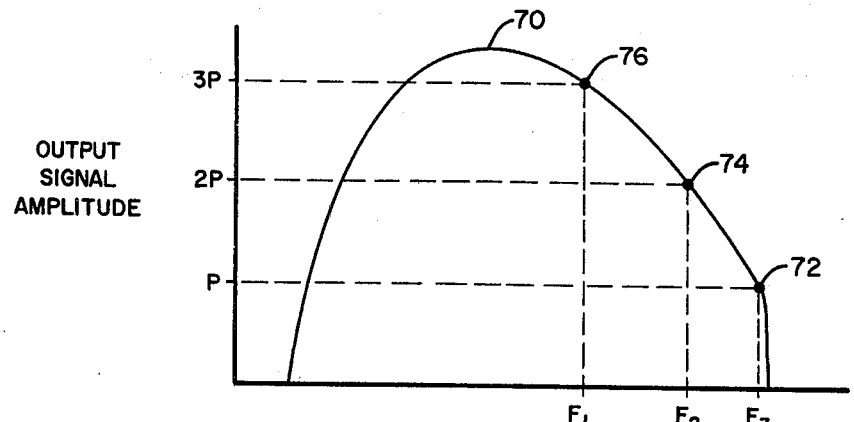
FIGURE 4 is an illustration of a graph of bias field intensity versus output signal amplitude for a device employing the principles of this invention.

In FIGURE 1 the variable-field magnetic element 10 is spacedly superposed permanently, over (or, if desired, under) film 12 with the easy magnetization axes 14 and 16 thereof being substantially parallel. Film 12 is preferably of the nickel-iron type, such as generally referred to as "Permalloy" films, and such as are producible, for example, in accordance with the teachings in the Rubens Patent No. 2,900,282. Preferably, film 12 is "thin" (10,000 angstroms or less) and is composed of 81% nickel, remainder iron, in order to produce a non-magnetostrictive effect. As is well-known, Permalloy and like thin films of the uniaxial anisotropy type, have an effective single easy magnetization axis along which an effective magnetization vector normally lies in one direction, representing one magnetic state, or in the opposite direction representing a second magnetic state, with a hard magnetization axis transversely oriented of the easy axis. The strength of this magnetization vector, when film 12 is considered alone, is determined by the properties of the film itself. However, that vector is rotatable in the plane of the film and can be biased in any desired direction to any desired degree.

The purpose of magnetic element 10, which may be a multistable thin film also but is preferably composed of cobalt at least in part, is to regulate the amount of bias which its external field imposes upon film 12 and its magnetization vector. Element 10 is capable of exhibiting any one of a variety of strengths of external field to which it is set, and maintaining that field strength until changed by some external means. In other words, the external field of magnetic element 10 may be varied from essentially zero to that external field thereof existing when the element is saturated in either direction, in almost an infinite number of discrete steps each of which represents a different remanent state of element 10. When element 10 is fully saturated in one direction, for example that illustrated by vector 18, effectively the element looks like a single domain and vector 18 is quite large. On the other hand, if element 10 is partially demagnetized, a number of magnetic domains will exist in the element. Generally speaking, adjacent ones of these domains may have their effective magnetization vectors effectively directed in opposite directions separated by so-called domain walls schematically represented by dash lines 20 and 22. In other words, assuming three different domains 24, 26, and 28 oriented as illustrated in FIGURE 1, which is not likely to be representative of an actual arrangement of domains when the element is in a partially demagnetized state but which is sufficient to represent the situation schematically, the reverse domains 24 and 28 with their relatively small magnetization vectors 30 and 32 will have North poles N at their lower ends in FIGURE 1, while the larger domain 26 has its N pole at the upper end. The large central domain 26 produces a field on the lower film 12 which tends to reverse, or actually does reverse, the magnetization thereof, but because the reverse domains 24 and 28 provide a field in the area of film 12 in the opposite direction, the total amount of bias effected on the magnetization vector of film 12, whether that film is switched or not by that total field, is reduced.

In order to control the amount of demagnetization of magnetic element 10, a conductor 34 may be disposed adjacent the element with its physical axis running parallel to the easy axis 14 of element 10, so that a substantial transverse field $H_T$ can be produced in element 10 (but not film 12) by current from generator 36 directed through conductor 34. That is, assuming element 10 is initially in a maximum remanent induction state, its state of remanence may be lowered to any desired degree according to the size of the transverse field $H_T$ applied. In order to reduce the remanence from maximum at all, $H_T$ must usually be at least about 0.6 of the anisotropy field inherent in element 10. If $H_T$ is as great as or larger than the anisotropy field, which is usually designated $H_K$, substantially complete demagnetization of element 10 will be effected upon release of such an $H_T$ field. Different degrees of demagnetization of element 10 may be effected by controlling the amount of current applied to conductor 34 by generator 36. Element 10 may be first set to maximum remanence in either direction by any desired means, for example by a conductor (not shown) carrying current transversely of that carried by conductor 34 to cause a saturating field in element 10 alone (or also in film 12 if desired) along easy axis 14.

As above indicated, upon being partially demagnetized, element 10 will normally contain a relatively large number of magnetic domains randomly disposed. The fewer the number of domains, the less likely is the possibility of the external field of element 10 being substantially uniform over the area of film 12. An averaging effect may be obtained by creating a multiplicity of small domains in element 10, by separating the element a small distance from film 12. Even if element 10 is saturated, it will produce a non-uniform field, with this external field being largest at the edges of the element unless there are internal or surface domains created. If the poles are at the edges then a separation of approximately 10% of the distance between the poles is sufficient to eliminate any of the local variations in field over the Permalloy film and create the desired relatively uniform biasing effect. When surface domains are introduced, the separation distance between the films should be approximately 10% of the length parallel to the easy axis of a typical surface domain in element 10, which again means that the separation should be approximately 10% of the distance between the poles of a domain. The actual size of surface domains varies, but usually it is more in the order of 1 millimeter or longer for Permalloy films.

The arrangement in FIGURE 1 is especially useful in parametric devices, for example a parametric oscillator such as illustrated in FIGURE 3, but may generally be considered as a way of adjusting the initial transverse permeability $u_T$ of film 12, since $$u_T = \frac{dB_T}{dH_T}$$

With no bias, $$u_T = \frac{4\pi M_O}{H_K}$$

where $M_O$ is the magnetization of Permalloy film 12 and $H_K$ its anisotropy field. With a bias $H_{DC}$ as provided by element 10, however, $$u_T = \frac{4\pi M_O}{H_K \pm H_{DC}}$$

where the ± sign is determined by whether or not the external bias from element 10 is respectfully aiding or in opposition to the remanence of film 12. Any conventional permeability measuring device 37 may be utilized to determine when the transverse permeability of film 12 is set as desired.

FIGURE 2 refers to a modification of FIGURE 1 wherein the respective easy axes 14 and 16 of element 10 and film 12 are disposed transversely of one another, instead of parallel as in FIGURE 1. In this arrangement, the spacing between the two magnetic elements may be as above indicated for FIGURE 1, the greater spacing illustrated in FIGURE 2 being for purposes of illustrating that the external field of element 10 operates to set the magnetization vector 38 of film 12 at any angle $\theta$ from 0° up to ±90° relative to the easy axis 16 of film 12 according to the direction and strength of the external field $H_{DC}$ resulting from element 10. That strength may be preset in the manner above indicated for regulating or adjusting the external field thereof in FIGURE 1. By this means, the size of angle $\theta$ can be controlled, since $$\sin \theta = \frac{H_{DC}}{H_K}$$

$H_K$ again being the anisotropy field of film 12. Because of the reverse domains in element 10, i.e., because element 10 is partially demagnetized, $\theta$ will be less than 90°. Instead of considering the FIGURE 2 arrangement as one for adjusting the size of angle $\theta$, it may alternately be considered as a way of varying the initial longitudinal permeability of film 12, i.e., its permeability along its own easy axis, since, for relatively small values of $H_{DC}$, $$u_L = \left[\frac{H_{DC}}{H_K}\right]^2$$

Again, any conventional permeability measuring device 39 may be employed to determine when the longitudinal permeability is initially set as desired. Adjusting the initial longitudinal permeability permits varying the inductance of a circuit in which film 12 has a principal influencing part, or permits changing the ferromagnetic resonance frequency thereof. In other words, the arrangement in FIGURE 2 may be employed in transformer embodiments, in LR or LC filters, to tuned circuits in linear amplifiers for variable inductances of a tuned circuit, and in any application of such devices including tuned or untuned parametric amplifiers, parametric oscillators, or parametric modulators or mixers. Adjusting the angle of the vector permits balancing or balanced modulators or mixers.

Further, either the arrangement in FIGURE 1 or that in FIGURE 2 can also be considered an analog nondestructive readout storage cell, wherein all the numerous possible values of remanent magnetization from $-B_S$ to $B_S$ may be stored in film 10, from time to time by presetting the magnetization direction and adjusting the degree of demagnetization as above indicated, and a quantity, either $u_T$ or $u_L$ according to whether FIGURE 1 or FIGURE 2 is being employed, measured to determine the particular value of stored remanent magnetization.

FIGURE 3 illustrates a parametric device which may be employed as a tuned amplifier, oscillator, or a modulator or mixer, all in accordance with the disclosure in the aforesaid Davis and Pohm application, Ser. No. 61,981, with the provision in accordance with the present invention of being able to minutely control the amount of bias that element 10 effects on film 12. As an oscillator, a varying signal applied to winding 40 from a pump signal generator 42 through closed switch 44 and filter 46, in conjunction with a control signal as applied by generator 48 to winding 50, causes the magnetization vector in film 12 to oscillate in the plane of that film, generally within the bounds of the automatically reversible rotation range of the vector. With such oscillations existing, an effective negative resistance is created across the terminals of winding 50, which terminals are connected by condenser 52, to cause output oscillations across load resistor 54 and output terminals 56. In accordance with the aforesaid Ehresman and Olson application, Ser. No. 122,922, filed July 10, 1961, now Patent No. 3,193,694, the state of film 12, i.e., the normal resting direction of its magnetization vector along its easy axis, may be determined by switching element 10 with a longitudinal field $H_L$ derived from current applied to winding 58 from source 60. This force may, in accordance with the present invention, be utilized to saturate element 10, in one direction or the other as desired, so that the desired amount of transverse field $H_T$ can be applied to element 10 by regulation of the amount of current issued from generator 36 as above described, to control the amount of demagnetization of element 10.

As shown in FIGURE 3, films 10 and 12 are separated so that winding 34 links only element 10. It is necessary that the $H_T$ field therey applied to element 10 for purposes of demagnetizing it to a predetermined degree, be not also applied to film 12, since to do so might at least partially demagnetize film 12 also, an undesirable result. Instead of looping only element 10 with winding 34, a printed circuit or like type of ribbon conductor may be disposed across element 10 as in FIGURES 1 and 2, in such a manner as to prevent the field created by that conductor from itself influencing film 12.

Although it has been above indicated that the degree of demagnetization may be adjusted by applying a predetermined size transverse field to element 10, which is the preferable method, any other way of partially demagnetizing a magnetic element is included within the scope of this invention, some other ways being, for example, by amplitude-limited switching or time-limited switching both of which are fully described in the copending application of V. J. Korkowski, Ser. No. 853,067, filed Nov. 16, 1959, now abandoned.

As previously indicated, element 10 preferably contains cobalt, but it may be made of, for example, without limitation intended, pure iron, pure cobalt, cobalt and nickel in any desired ratio, or cobalt and iron also in any desired ratio but preferably 80 to 95% cobalt, remainder iron, or any three element alloy such as 30% nickel, 30% cobalt and 40% iron. Especially in situations where the magnetization vector of film 12 oscillates in operation of the device, element 10 should have a substantially greater coercive force than that of film 12, preferably several times greater, for example five, to prevent switching of its magnetization vector during any oscillation of the magnetic vector of film 12. Generally, the thicker element 10 is, the larger its external field, and such external field must be great enough to overcome to a desired degree the external field of film 12. The anisotropy field of element 10 should, for most applications, be relatively high compared to that of film 12, to effect desired operations.

For certain applications of parametric devices, it is desirable that the outputs of the devices be similar enough in amplitude to allow desired operation of, or cooperation between, the devices. This is true of parametric amplifiers in certain instances, as well as parametric oscillators. For example, in a computer which is designed to employ parametrons completely, as suggested for example in the article by Muroga et al., entitled "The Parametron Digital Computer Musasino-1" beginning on page 308 in the September 1959 issue of the IRE Transactions on Electronic Computers (vol. EC-8, No. 3) it is desirable to be able to control, and have operating tolerances for, the numerous different parametron output amplitudes in order to effect reliable operation of the computer. To accomplish this requires assurance that output amplitudes will be in a desired amplitude range. The amplitude of the output is determined by the magnitude of the negative resistance effected by the device, all other variables being constant.

In the above referenced Muroga et al. article there is referenced an article "On the Logical Elements with Majority Decision Principle and the Complexity of Their Circuits" revised and published in the Proceedings of the International Congress on Information Processing, Paris, France, June, 1959, authored by S. Muroga. This latter article discusses weighted inputs to magnetic parametric devices as a "coupling number" but does not discuss the generation thereof. Applicant's disclosure, with particular reference to FIGS. 4 and 6, discloses one use of applicant's invention as a means of generating such weighted inputs when used in conjunction with a parametron logic array.

As stated previously, the present application provides a second bias film whose variable external remanent magnetic field intensities bias a first oscillating film into corresponding output signal amplitudes. Thus, by controlling the remanent magnetization of the bias film, predetermined output signal amplitudes are obtained. With particular reference to FIGURE 4 there is illustrated a graph of bias field intensity versus output signal amplitude showing the inverse characteristic of the bias field output signal curve 70 in the area 72–74–76. This inverse characteristic portion of curve 70 illustrates that for bias field intensities $F_1$–$F_2$–$F_3$ there are corresponding output signal amplitudes P–2P–3P; with the amplitude of 2P being twice that of P and the amplitude of 3P being thrice that of P. Applicant utilizes this relationship to achieve two distinct features; provide a uniform output signal amplitude from a plurality of dissimilar thin film devices, and provide a programmable logical variable. As the manufacture of thin film devices is, as yet, an art rather than an exact science, the fabrication of a plurality of such devices all having substantially similar magnetic characteristics is difficult to achieve. Thus, it is desirable, and it is achieved by applicant's invention, to utilize a plurality of such dissimilar devices and achieve substantially similar output signal amplitudes therefrom. The hereinbefore referenced copending application of Ehresman, Ser. No. 81,360, filed January 9, 1961, achieves a uniform output signal amplitude from a plurality of dissimilar thin film devices by angulating the bias field with respect to the easy axis of the oscillating film while applicant's present invention achieves a uniform output signal amplitude by adjusting the bias field intensity to alter the magnetization of the oscillation film so as to adjust its output signal amplitude to a standard norm.

In the article entitled "Some Applications of Magnetic Film Parametrons as Logical Devices," R. F. Schauer et al., IRE Transactions on Electronic Computers, vol. EC-9, No. 3, pp. 315-320, September 1960, there are disclosed some uses of thin film parametrons as elements in a logic array. In FIGURE 7, page 318, of this article, there is disclosed a "full adder" utilizing two parametrons of which the complement of the output of the first parametron is coupled twice to the second parametron. As two unit weight inputs to a parametron are equivalent to one double weight input, it can be seen that by the utilization of applicant's invention in effecting an increased output signal amplitude by a decreased bias field intensity a double weighted output signal amplitude can be achieved. This alteration of the bias field intensity may be a programmed logic variable as a translated function of a program instruction word operation code, or this ability to weight the output may be a permanent feature of the logic array simplifying wiring and control requirements.

Figure 5:
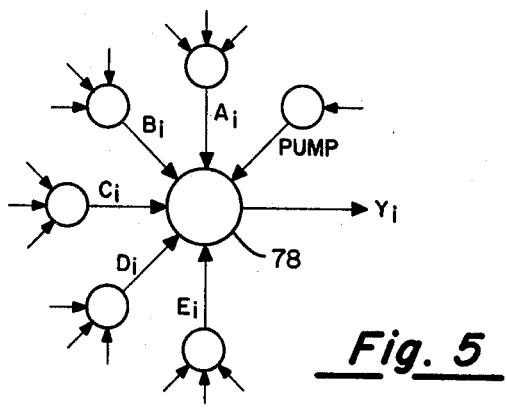
FIGURE 5 is an illustration of a parametron, having a plurality of inputs, operated as a majority logic device employing the principles of this invention.

With particular attention to FIGURE 5, there is disclosed a parametron 78 having a plurality of inputs $A_i$, $B_i$, $C_i$, $D_i$ and $E_i$ each being an output of a respectively associated parametron where $A_i$, $B_i$, $C_i$, $D_i$ and $E_i$ are the logic representation of the $i$'th bit of multibit digital characters A, B, C, D and E, respectively. This is the logic equivalent to the well-known majority logic equation:

$$Y_i = A_i \# B_i \# C_i \# D_i \# E_i$$

Assuming a two-phase system, it is apparent that a majority of either one or the other phase signal will produce a corresponding output signal $Y_i$. The apparatus of FIGURE 5 may thus be considered a logical "majority OR" element in that it generates a corresponding output signal upon a majority of either one of the two input signals. Further, such an apparatus, unless suppressed, usually generates an output signal even though there is not a majority input. However, such output signal is undeterminable in phase and consequently fully ambiguous and useless as a logic signal. Suppression of an output signal may be accomplished by demagnetizing the oscillating film or by providing no bias thereto—see FIGURE 4.

As the number of input signals increase, the tolerance on such signals must necessarily decrease. Thus, in the apparatus of FIGURE 5, is it apparent that the sum of any combination of three inputs must be substantially larger than the sum of the other two inputs. This relationship is assured by applicant's invention in that a substantially similar predetermined output signal amplitude P can be achieved for each parametron by adjusting the bias field intensity for each parametron accordingly. Thus, assuming that in a random selection of thin film parametrons the curve 70 for each parametron would vary over a determinable range, it is only necessary to determine what bias field intensity will provide an output signal amplitude P and then establish the magnetization of the bias film at such a state so as to provide the corresponding bias field intensity that will provide the desired output signal amplitude P. Accordingly, it is apparent that applicant's invention will provide a highly accurate logic element.

Figure 6:
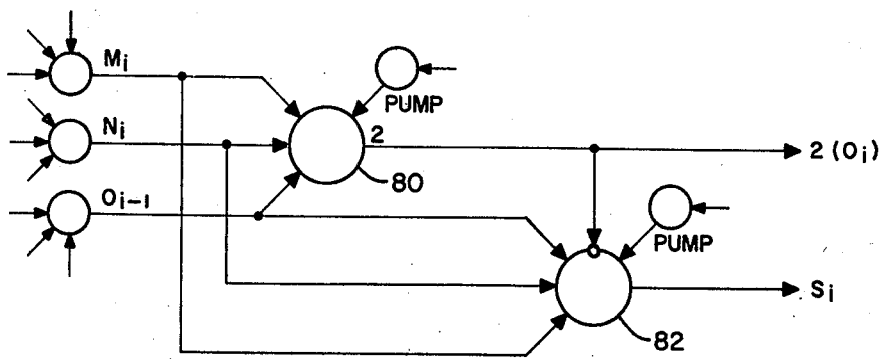
FIGURE 6 is an illustration of two parametrons arranged in a logical array to perform a full adder function while employing the principles of this invention.

As an extension of the above discussed application of applicant's invention, consider the apparatus of FIGURE 6 wherein there is disclosed parametrons 70 and 80 arranged in a logical array to perform a "full adder" function with a plurality of inputs $M_i$, $N_i$, and $O_{i-1}$ each being an output of a respectively associated parametron where $M_i$ and $N_i$ are the logic representations of the $i$'th bit of multibit digital characters M and N and O is the carry logic representation of the $(i-1)$'th bits of M and N. This is the logic equivalent to the well-known majority logic equation:

$$S_i = M_i \# N_i \# O_{i-1} = \#(\overline{M_i \# N_i \# O_{i-1}})^2$$

Normally, as discussed in the above referred to article of Schauer et al., the output $O_i$ of parametron 78 is a unit weight whose negation is coupled to two separate inputs of parametron 80. However, by adjusting the bias field intensity from a value $F_3$ to a value $F_2$ the output of parametron 78 is increased from an amplitude of P at point 72 to an amplitude of 2P at point 74 By this doubling of the weight (doubling the amplitude from P to 2P) of the output signal of parametron 78, only one negated input to parametron 80 is required.

Thus, it is apparent that the various objects and advantages herein set forth are successively achieved. Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

I claim:
1. A magnetic device, comprising:
   a first multistable magnetic film;
   means for magnetostatically biasing said first film including a magnetic element and adjusting means coupled to said element for causing the degree of remanent magnetization of said element to assume any one of a plurality of different partially demagnetized stable states between its saturated stable states, each of said partially demagnetized stable states causing said element's external remanent magnetic field in the area of said first film to assume a corresponding different field strength and direction;
   each of said element's different partially demagnetized stable states affecting said first film's magnetization in a determined corresponding different manner;
   means inductively coupled to said first film for causing said first film's magnetization to oscillate about a determined axis.
2. The device of claim 1 wherein said determined axis is determined by the relative strengths of said first film's magnetization and said element's external remanent magnetic field in the area of said first film.
3. The device of claim 1 wherein said first film and element have effective easy magnetization axes which are substantially aligned, and said adjusting means effectively adjusts the transverse permeability of said first film.
4. The device of claim 1 wherein said first film and element have effective easy magnetization axes which are substantially aligned transverse one another, and said adjusting means effectively adjusts the longitudinal permeability of said first film.
5. The device of claim 1 wherein said first film's magnetization is a vector which oscillates substantially in the plane of said first film and within the bounds of its automatically reversible rotation range.
6. The device of claim 5 further including output means inductively coupled to said first film for detecting an output signal therefrom wherein each of said element's different partially demagnetized stable states effects said first film's oscillating vector in a determined coresponding different manner for causing said first film to generate a determined corresponding different output signal amplitude in said output means.

7. The device of claim 1 wherein said element is a second multistable magnetic film and is in a spaced, superposed relationship with said first film.

8. The device of claim 7 wherein the separation between said films is approximately 10% of the distance between the poles of a domain in said second film.

9. The device of claim 7 wherein said second film has a coercive force and an anisotropic field that are substantially larger, respectively, than those of said first film.

10. A magnetic device, comprising:
a first multistable magnetic film having an effective magnetization vector rotatable in the plane of the first film;
means inductively coupled to said first film for oscillating said vector about a determined axis;
means inductively coupled to said first film for magnetostatically biasing said first film's vector including a magnetic element and adjusting means inductively coupled to said element for causing the degree of remanent magnetization of said element to assume any one of a plurality of different remanent states between and including maximum negative or positive remanence for causing said element's external remanent magnetic field in the area of said first film to assume a corresponding different field strength, each corresponding different field strength effecting said first film's vector in a determined corresponding different manner including effecting said determined axis.

11. A magnetic device, comprising:
a first multistable magnetic film having an effective magnetization vector rotatable in the plane of the first film;
means inductively coupled to said first film for magnetostatically biasing said first film's vector in a determined manner, including;
a magnetic element, and,
means inductively coupling an analog signal to said element for causing the degree of remanent magnetization of said element to assume any one of a plurality of different partially demagnetized states between its saturated states, each different partially demagnetized stable state determined by the amplitude and direction of said analog signal;
each different partially demagnetized stable state of said element causing said element's external remanent magnetic field to assume a corresponding different field strength and direction in the area of said first film;
each corresponding different field strength and direction of said element in the area of said first film effecting said first film's vector in a determined corresponding different manner;
means inductively coupled to said first film for reading out the amplitude and direction of said analog signal as the determined corresponding different manner said first film's vector is effected by said element's external remanent magnetic field;
said reading out means including means inductively coupled to said first film for causing said first film's vector to oscillate about said determined axis within the bounds of its automatically reversible rotation range.

12. A magnetic device comprising:
a first multistable state magnetic oscillation film having an effective magnetization vector lying along an easy magnetization axis which vector is rotatable substantially in the plane of said oscillation film;
a second multistable state magnetic bias film having an effective magnetization vector lying along an easy magnetization axis which vector is rotatable substantially in the plane of said bias film;
means inductively coupled to said bias film for causing the degree of remanent magnetization of said bias film to assume any one of a plurality of different partially demagnetized stable states between its fully saturated stable states causing said bias film's external remanent magnetic field to assume any one of a plurality of corresponding field strengths in the area of said oscillation film;
means inductively coupled to said oscillation film providing a pump field in the area of said oscillation film for causing said oscillation film's magnetization vector to oscillate about an axis determined by the relative strengths of said oscillation film's magnetization and said bias film's external remanent magnetic field in the area of said oscillation film;
means inductively coupled to said oscillation film for detecting an output signal generated by said oscillation film's oscillating magnetization vector;
each of said plurality of bias film's different partially demagnetized stable states causing said oscillation film's oscillating magnetization vector to generate a corresponding predetermined output signal amplitude in said output signal detecting means.

13. A magnetic device comprising:
a first multistable state magnetic oscillation film having an effective magnetization vector lying along an easy magnetization axis which vector is rotatable substantially in the plane of said oscillation film;
a second multi-stable state magnetic bias film having an effective magnetization vector lying along an easy magnetization axis which vector is rotatable substantially in the plane of said bias film;
means inductively coupled to said bias film for causing the degree of remanent magnetization of said bias film to assume any one of a plurality of different partially demagnetized stable states between its fully saturated stable states causing said bias film's external remanent magnetic field to assume any one of a plurality of corresponding field strengths and directions in the area of said oscillation film;
a plurality of input signal means, each coupled to said oscillation film for coupling a plurality of first and second input signals of different first and second predetermined amplitude and phase characteristics, respectively;
means inductively coupled to said oscillation film providing a pump field in the area of said oscillation film for causing said oscillation film's magnetization vector to oscillate about a determined axis;
means inductively coupled to said oscillation film for detecting an output signal generated by said oscillating film's oscillating magnetization vector;
each of said plurality of bias film's different partially demagnetized stable states causing said oscillating film's oscillating magnetization vector to generate an output signal having a predetermined amplitude and phase characteristic in said output signal detecting means upon the coupling thereto of more of one than of the other of said first and second signals.

14. In a magnetic device, the combination of a majority decision logic device and a plurality of signal devices;
each of said plurality of signal devices including a first multistable state magnetic oscillation film having an effective magnetization vector lying along an easy magnetization axis which vector is substantially rotatable in the plane of said oscillation film and a corresponding second multistable state magnetic bias film having an effective magnetization vector lying along an easy magnetization axis which vector is rotatable substantially in the plane of said bias film, said bias film and said oscillation film in a permanently superposed relationship, said bias film capable of providing an external remanent magnetic field of substantial strength in the area of said oscillation film;

bias means inductively coupled to each signal device's bias film for causing the magnetization of each bias film to assume any one of a plurality of different, partially demagnetized stable states causing each bias film's external remanent magnetic field to assume any one of a plurality of corresponding field strengths and directions in the area of its corresponding oscillation film;

means inductively coupled to each signal device providing a pump field to each signal device in the area of its oscillation film for causing its oscillation film's magnetization vector to oscillate about an axis determined by the relative strengths and directions of each signal device's corresponding oscillation film's magnetization and bias film's external remanent magnetic field in the area of the corresponding oscillation film;

means inductively coupled to each signal device's oscillation film for detecting an output signal of any one of a plurality of characteristics which output signal is generated by said oscillation film's oscillating magnetization vector, said output signals being coupled to said logic device for providing a plurality of logic signal inputs thereto;

said bias means setting the magnetization of each signal device's bias film at one of said different, partially demagnetized stable states causing each signal device's oscillation film's oscillating magnetization vector to generate a substantially similar output signal amplitude in its output signal detecting means for enabling said logic device to make a majority decision upon the coupling thereto of more of one than of any other of the output signals of like characteristics.

15. In a magnetic device, the combination of a majority decision logic device and an odd integer number of signal devices;

each of said devices including a first multistable state magnetic oscillation film having an effective magnetization vector lying along an easy magnetization axis which vector is substantially rotatable in the plane of said oscillation film and a corresponding second multistable state magnetic bias film having an effective magnetization vector lying along an easy magnetization axis which vector is rotatable substantially in the plane of said bias film, said bias film and said oscillation film in a permanently superposed relationship, said bias film capable of providing an external remanent magnetic field of substantial strength in the area of said oscillation film;

bias means inductively coupled to each device varying the magnetization of each device's bias film for causing the magnetization of each bias film to assume any one of a plurality of different, partially demagnetized stable states between its fully saturated stable states causing said bias film's external remanent magnetic field to assume any one of a plurality of corresponding field strengths and directions in the area of its corresponding oscillation film causing each oscillation film to be capable of providing at least a single and a double weight output signal each of at least first and second phase characteristics, means inductively coupled to each device providing a pump field to each device in the area of its oscillation film for causing its oscillation film's magnetization vector to oscillate about an axis determined by the relative strengths of the corresponding oscillation film's magnetization and the bias film's external remanent magnetic field in the area of the corresponding oscillation film;

means inductively coupled to each signal device's oscillation film for detecting said weighted output signal, said output signals being coupled to said logic device's oscillation film for providing a plurality of weighted logic signal inputs thereto;

said bias means setting the magnetization of each signal device's bias film at one of said different partially demagnetized stable states for causing each signal device's oscillation film's oscillating magnetization vector to generate and cause each of said weighted output signals of a like phase and weight characteristic to be of a substantially similar output signal amplitude in its output signal detecting means for enabling said logic device to make a majority decision upon the coupling thereto of more of one weight than of any other of said signal devices' weighted output signals of like characteristics.

References Cited

UNITED STATES PATENTS 3,113,297 12/1963 Dietrich _____ 340—174
3,193,694 7/1965 Ehresman et al. _____ 307—88

STANLEY M. URYNOWICZ, JR., Primary Examiner